United States Patent
Bidner et al.

(10) Patent No.: US 8,844,272 B2
(45) Date of Patent: Sep. 30, 2014

(54) PARTICULATE FILTER REGENERATION DURING ENGINE SHUTDOWN

(75) Inventors: David Karl Bidner, Livonia, MI (US); Ralph Wayne Cunningham, Milan, MI (US); Jeffrey Scott Hepburn, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 120 days.

(21) Appl. No.: 13/477,885

(22) Filed: May 22, 2012

(65) Prior Publication Data

US 2012/0227382 A1 Sep. 13, 2012

Related U.S. Application Data

(63) Continuation of application No. 12/629,743, filed on Dec. 2, 2009, now Pat. No. 8,181,452.

(60) Provisional application No. 61/246,933, filed on Sep. 29, 2009.

(51) Int. Cl.
| | |
|---|---|
| *F01N 3/22* | (2006.01) |
| *F02M 25/07* | (2006.01) |
| *F01N 3/30* | (2006.01) |
| *F01N 3/023* | (2006.01) |
| *F01N 3/10* | (2006.01) |
| *F02D 41/02* | (2006.01) |
| *F02D 41/04* | (2006.01) |
| *F01N 13/00* | (2010.01) |
| *F02D 41/00* | (2006.01) |

(52) U.S. Cl.
CPC ........... *F01N 3/023* (2013.01); *F02M 25/0709* (2013.01); *F01N 3/30* (2013.01); *F02D 2200/0812* (2013.01); *F01N 3/0238* (2013.01); *F02M 25/0707* (2013.01); *F02D 41/0055* (2013.01); *F01N 3/0233* (2013.01); *F01N 3/101* (2013.01); *Y02T 10/22* (2013.01); *F02D 41/029* (2013.01); *F02D 41/042* (2013.01); *F01N 13/009* (2013.01)
USPC ........... 60/295; 60/274; 60/278; 60/289; 60/297; 60/301; 60/311; 180/65.265; 180/65.27; 180/65.275

(58) Field of Classification Search
USPC ........... 60/274, 278, 289, 295, 297, 301, 311; 180/65.265, 65.27, 65.275, 65.28; 903/905
See application file for complete search history.

(56) References Cited

U.S. PATENT DOCUMENTS

| | | | | |
|---|---|---|---|---|
| 3,705,497 | A * | 12/1972 | Hollins | 60/283 |
| 5,609,021 | A * | 3/1997 | Ma | 60/274 |
| 7,299,626 | B2 | 11/2007 | Barasa et al. | |
| 8,136,343 | B2 | 3/2012 | Zawacki et al. | |
| 8,136,505 | B2 | 3/2012 | Ruhland et al. | |
| 8,256,205 | B2 * | 9/2012 | Weber | 60/276 |
| 2002/0165660 | A1 * | 11/2002 | Boggs et al. | 701/112 |

(Continued)

*Primary Examiner* — Thomas Denion
*Assistant Examiner* — Jorge Leon, Jr.
(74) *Attorney, Agent, or Firm* — Julia Voutyras; Alleman Hall McCoy Russell & Tuttle LLP (57) ABSTRACT

Various systems and method are described for controlling an engine having an exhaust system which includes a particulate filter. One example method comprises, after shutting down the engine and spinning down the engine to rest, operating a vacuum pump to draw fresh air through the exhaust system to an intake system, and regenerating at least a portion of the particulate filter during the engine rest.

16 Claims, 7 Drawing Sheets

(56) References Cited

U.S. PATENT DOCUMENTS

| | | | |
|---|---|---|---|
| 2006/0201468 A1* | 9/2006 | Lancaster et al. | 123/179.5 |
| 2007/0175208 A1* | 8/2007 | Bandl-Konrad et al. | 60/286 |
| 2009/0025371 A1* | 1/2009 | Hermansson et al. | 60/286 |
| 2009/0120071 A1 | 5/2009 | Gandhi et al. | |
| 2011/0047978 A1 | 3/2011 | Zawacki et al. | |
| 2011/0048106 A1 | 3/2011 | Zawacki et al. | |
| 2011/0072783 A1 | 3/2011 | Hepburn et al. | |
| 2011/0072784 A1 | 3/2011 | Hepburn et al. | |
| 2011/0072787 A1 | 3/2011 | Hubbard et al. | |
| 2011/0072788 A1 | 3/2011 | Ruona et al. | |
| 2011/0072791 A1 | 3/2011 | Bidner et al. | |
| 2011/0072793 A1 | 3/2011 | Bidner et al. | |
| 2011/0072794 A1 | 3/2011 | Van Nieuwstadt et al. | |
| 2011/0072795 A1 | 3/2011 | Kerns et al. | |
| 2011/0072796 A1 | 3/2011 | Van Nieuwstadt | |
| 2011/0072797 A1 | 3/2011 | Van Nieuwstadt | |
| 2011/0072799 A1 | 3/2011 | Bidner et al. | |
| 2011/0072800 A1 | 3/2011 | Bidner et al. | |
| 2011/0072801 A1 | 3/2011 | Lupescu et al. | |
| 2011/0072802 A1 | 3/2011 | Bidner et al. | |
| 2011/0072803 A1 | 3/2011 | Van Nieuwstadt et al. | |
| 2011/0072804 A1 | 3/2011 | Van Nieuwstadt et al. | |
| 2011/0073088 A1 | 3/2011 | Hubbard et al. | |

* cited by examiner

FIG. 7

PARTICULATE FILTER REGENERATION DURING ENGINE SHUTDOWN

CROSS REFERENCE TO RELATED APPLICATIONS

The present application claims priority to U.S. patent application Ser. No. 12/629,743, filed Dec. 2, 2009, which is now U.S. Pat. No. 8,181,452, which claims priority to U.S. Provisional Patent Application No. 61/246,933, filed Sep. 29, 2009, titled "Particulate Filter Regeneration During Engine Shutdown," the entire contents of each of which are incorporated herein by reference for all purposes.

TECHNICAL FIELD

The present application relates generally to an engine having an exhaust system which includes a particulate filter.

BACKGROUND AND SUMMARY

Direct injection (DI) engines may produce more soot than port fuel injected engines due to, for example, diffuse flame propagation. As a consequence of diffuse flame propagation, fuel may not adequately mix with air prior to combustion resulting in pockets of rich combustion that generate soot. Further, DI engines may be susceptible to generating soot during high load and/or high speed conditions when there is a lack of sufficient air and fuel mixing.

The inventors herein have recognized various issues in applying particulate filters to DI, spark-ignition engine, for example in maintaining accurate emission control during filter regeneration.

Thus, in one example, a method of controlling an engine having an exhaust system which includes a particulate filter is disclosed. The method comprises, after shutting down the engine and spinning down the engine to rest, operating a vacuum pump to draw fresh air through the exhaust system to an intake system, and regenerating at least a portion of the particulate filter during the engine rest.

In this manner, at least some filter regeneration in a spark-ignited engine may be carried out while the engine is shutdown, thus reducing an impact on engine running emissions. Thus, in the example where filter regeneration also occurs during engine operation, less engine-running filter regeneration may be used.

In one specific example, an exhaust gas recirculation (EGR) system may be employed to facilitate regeneration of the particulate filter. After the engine is shutdown, an EGR valve may be opened and the vacuum pump turned on so that fresh air is drawn through the particulate filter and into the intake manifold via the EGR system. In this way, fresh air containing oxygen (e.g., $O_2$) may be drawn through the particulate filter thus assisting in regeneration of the particulate filter. In another embodiment, positive valve overlap of at least one cylinder being present at the stopped position may be used instead of, or in addition to, the EGR system, to enable fresh airflow from the exhaust system to the intake system while the engine is at rest.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to a method for regenerating a particulate filter in an engine, such as a direct injection gasoline engine. During a first operating condition of the engine, combustion in the engine may be carried out about stoichiometry and exhaust gas may flow from the engine in a first direction, through a three way catalyst, and then to a particulate filter where soot generated by the engine is collected. During a second operating condition in which the engine is shutdown, fresh air may flow through the exhaust system in a second direction which is opposite the first direction in order to assist in regeneration of the particulate filter. Fresh air flowing in the second direction may be drawn in through the tailpipe via a vacuum pump coupled to the intake manifold so that it flows through the particulate filter and then to the intake manifold. In some embodiments, an exhaust gas recirculation (EGR) system may be utilized to allow air to flow between the exhaust and intake manifolds while the engine is shutdown. In other embodiments, positive valve overlap may be used to allow the fresh air to flow from the exhaust system to the intake manifold while the engine is shutdown.

Figure 1:
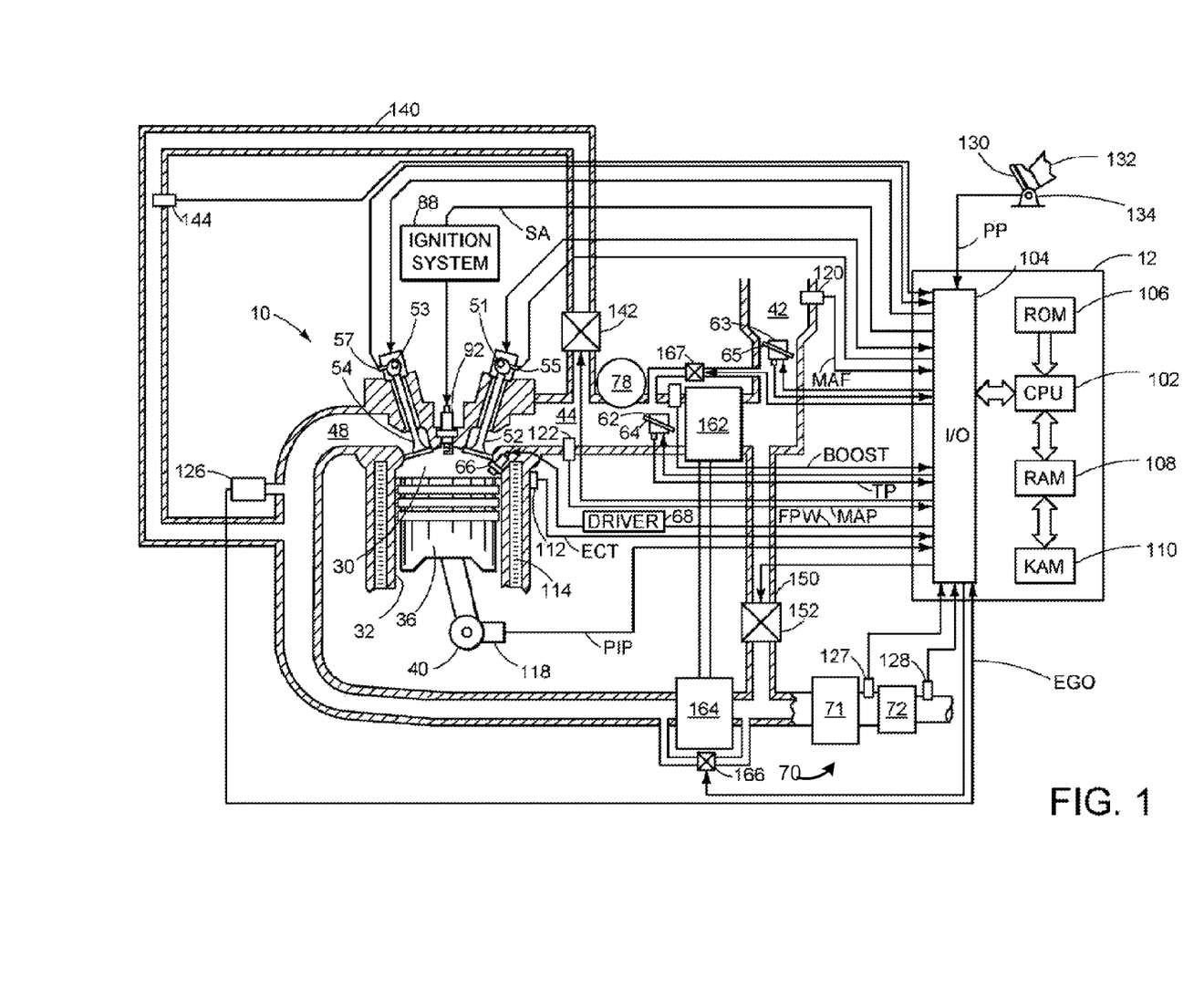
FIG. 1 shows a schematic diagram of an engine with a turbo charger and an exhaust gas recirculation system.

FIG. 1 is a schematic diagram showing one cylinder of multi-cylinder engine 10, which may be included in a propulsion system of an automobile. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. In some embodiments, the face of piston 36 inside cylinder 30 may have a bowl. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

Intake valve 52 may be controlled by controller 12 via electric valve actuator (EVA) 51. Similarly, exhaust valve 54 may be controlled by controller 12 via EVA 53. Alternatively, the variable valve actuator may be electro hydraulic or any other conceivable mechanism to enable valve actuation. During some conditions, controller 12 may vary the signals provided to actuators 51 and 53 to control the opening and closing of the respective intake and exhaust valves. The position of intake valve 52 and exhaust valve 54 may be determined by valve position sensors 55 and 57, respectively. In alternative embodiments, one or more of the intake and exhaust valves may be actuated by one or more cams, and may utilize one or more of cam profile switching (CPS), variable cam timing (VCT), variable valve timing (VVT) and/or variable valve lift (VVL) systems to vary valve operation. For example, cylinder 30 may alternatively include an intake valve controlled via electric valve actuation and an exhaust valve controlled via cam actuation including CPS and/or VCT.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Intake passage 42 may include throttles 62 and 63 having throttle plates 64 and 65, respectively. In this particular example, the positions of throttle plates 64 and 65 may be varied by controller 12 via signals provided to an electric motor or actuator included with throttles 62 and 63, a configuration that is commonly referred to as electronic throttle control (ETC). In this manner, throttles 62 and 63 may be operated to vary the intake air provided to combustion chamber 30 among other engine cylinders. The positions of throttle plates 64 and 65 may be provided to controller 12 by throttle position signals TP. Intake passage 42 may include a mass air flow sensor 120 and a manifold air pressure sensor 122 for providing respective signals MAF and MAP to controller 12.

Further, in the disclosed embodiments, an exhaust gas recirculation (EGR) system may route a desired portion of exhaust gas from exhaust passage 48 to intake passage 44 via high pressure EGR (HP-EGR) passage 140 or low pressure EGR (LP-EGR) passage 150. The amount of EGR provided to intake passage 44 may be varied by controller 12 via HP-EGR valve 142 or LP-EGR valve 152. Further, an EGR sensor 144 may be arranged within the EGR passage and may provide an indication of one or more of pressure, temperature, and concentration of the exhaust gas. Alternatively, the EGR may be controlled through a calculated value based on signals from the MAF sensor (upstream), MAP (intake manifold), MAT (manifold gas temperature) and the crank speed sensor. Further, the EGR may be controlled based on an exhaust $O_2$ sensor and/or an intake oxygen sensor (intake manifold). Under some conditions, the EGR system may be used to regulate the temperature of the air and fuel mixture within the combustion chamber. FIG. 1 shows a high pressure EGR system where EGR is routed from upstream of a turbine of a turbocharger to downstream of a compressor of a turbocharger and a low pressure EGR system where EGR is routed from downstream of a turbine of a turbocharger to upstream of a compressor of the turbocharger. In some embodiments, engine 10 may include only an HP-EGR system or only an LP-EGR system.

As such, Engine 10 may further include a compression device such as a turbocharger or supercharger including at least a compressor 162 arranged along intake manifold 44. For a turbocharger, compressor 162 may be at least partially driven by a turbine 164 (e.g., via a shaft) arranged along exhaust passage 48. For a supercharger, compressor 162 may be at least partially driven by the engine and/or an electric machine, and may not include a turbine. Thus, the amount of compression provided to one or more cylinders of the engine via a turbocharger or supercharger may be varied by controller 12. Further, turbine 164 may include wastegate 166 to regulate the boost pressure of the turbocharger. Similarly, intake manifold 44 may include valved bypass 167 to route air around compressor 162.

Exhaust gas sensor 126 is shown coupled to exhaust passage 48 upstream of emission control system 70. Further, sensor 127 is shown coupled to exhaust passage 48 upstream of particulate filter 72 and sensor 128 is shown coupled to exhaust passage 48 downstream of particulate filter 72. Sensors 126, 127, and 128 may be a combination of any suitable sensors for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor.

Emission control devices 71 and 72 are shown arranged along exhaust passage 48 downstream of exhaust gas sensor 126. Devices 71 and 72 may be a selective catalytic reduction (SCR) system, three way catalyst (TWC), $NO_x$ trap, various other emission control devices, or combinations thereof. For example, device 71 may be a TWC and device 72 may be a particulate filter (PF). In some embodiments, PF 72 may be located downstream of TWC 71 (as shown in FIG. 1), while in other embodiments, PF 72 may be positioned upstream of TWC 72 (not shown in FIG. 1). Further, in some embodiments, during operation of engine 10, emission control devices 71 and 72 may be periodically reset by operating at least one cylinder of the engine within a particular air/fuel ratio. In still further embodiments, PF 72 may be regenerated while the engine is shutdown, as will be described in detail below.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

Storage medium read-only memory 106 can be programmed with computer readable data representing instructions executable by processor 102 for performing the methods described below as well as other variants that are anticipated but not specifically listed.

Engine 10 may further include pump 78 coupled to the intake manifold. Pump 78 may be a vacuum pump utilized for the brake system and/or other accessories and systems. In some embodiments, pump 78 may be used during engine shutdown to draw fresh air through the tailpipe and into the exhaust system, as will be described in greater detail below.

As described above, FIG. 1 shows only one cylinder of a multi-cylinder engine, and that each cylinder may similarly include its own set of intake/exhaust valves, fuel injector, spark plug, etc.

Figure 2:
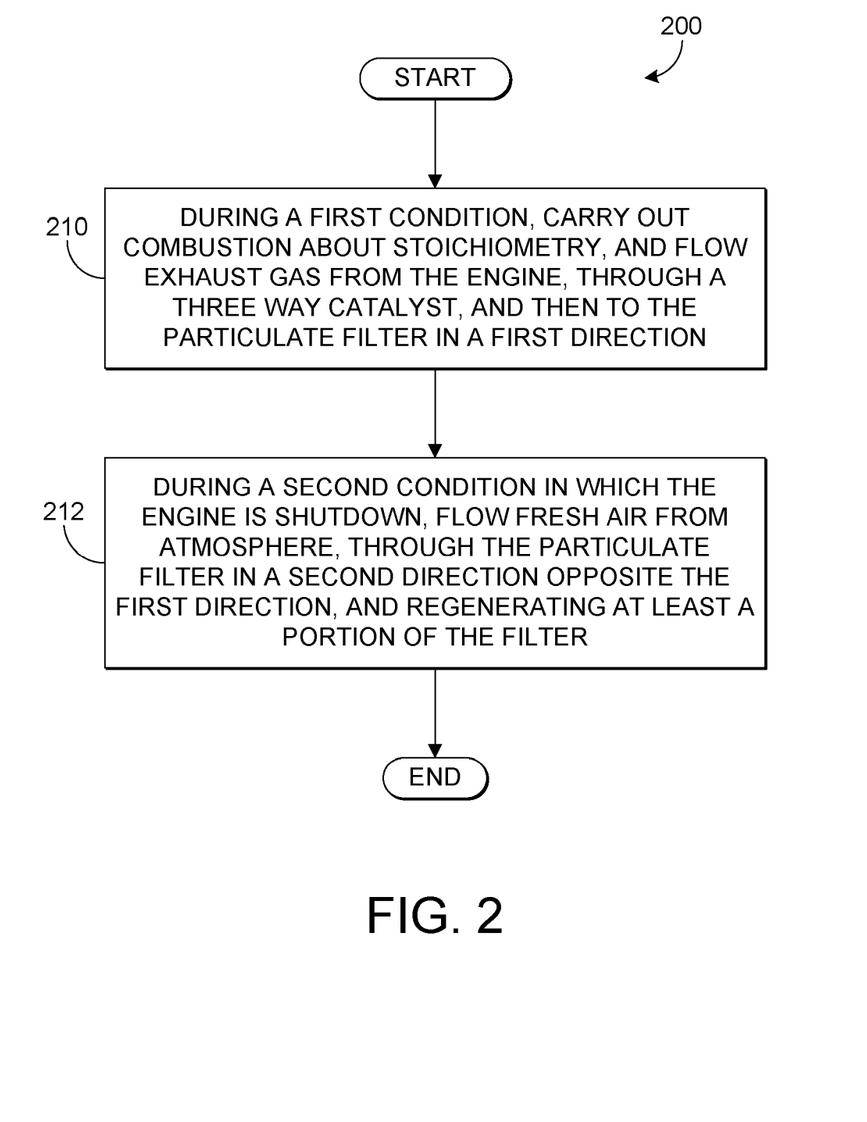
FIG. 2 shows a flow chart illustrating a method for an engine in a vehicle.

Turning now to FIG. 2, an operational flow chart illustrating a method 200 for an engine in a vehicle, such as engine 10 in FIG. 1, is shown. Specifically, method 200 demonstrates the flow of air and/or exhaust through a direct injection gasoline engine based on engine operating conditions.

At 210 of method 200, the engine is operated under a first condition. During the first condition, combustion in the engine is carried out about stoichiometry and exhaust gas flows in a first direction from the engine, through the three way catalyst, and then through the particulate filter. In some embodiments, a high pressure exhaust gas recirculation (EGR) system may be utilized and exhaust gas that exits the engine may enter the EGR system and flow into the intake manifold.

At 212 of method 200, the engine is operated under a second condition in which the engine is shutdown. During the second condition, fresh air flows from the atmosphere, through the particulate filter and three way catalyst, and into the intake manifold in a second direction, which is opposite to the first direction. As such, regeneration of the particulate filter may occur while the engine is shutdown and spun down to rest.

In some embodiments, the EGR valve may be at least partially open during the second condition and the fresh air flow may be generated by a vacuum pump coupled to the intake manifold. In other embodiments, during the second condition, the EGR valve may be closed and the intake and exhaust valves of at least one cylinder in the engine may be stopped with positive valve overlap such that the vacuum pump may draw fresh air the cylinders in the second direction.

Further, in some embodiments, the direction of air flow through the exhaust system may not change during the second condition (e.g., it is the same as the first direction during the first condition). For example, a hybrid-electric propulsion system may include a ram air intake for drawing fresh air into the exhaust while the vehicle is moving, as will be described below with reference to FIG. 3.

Figure 3:
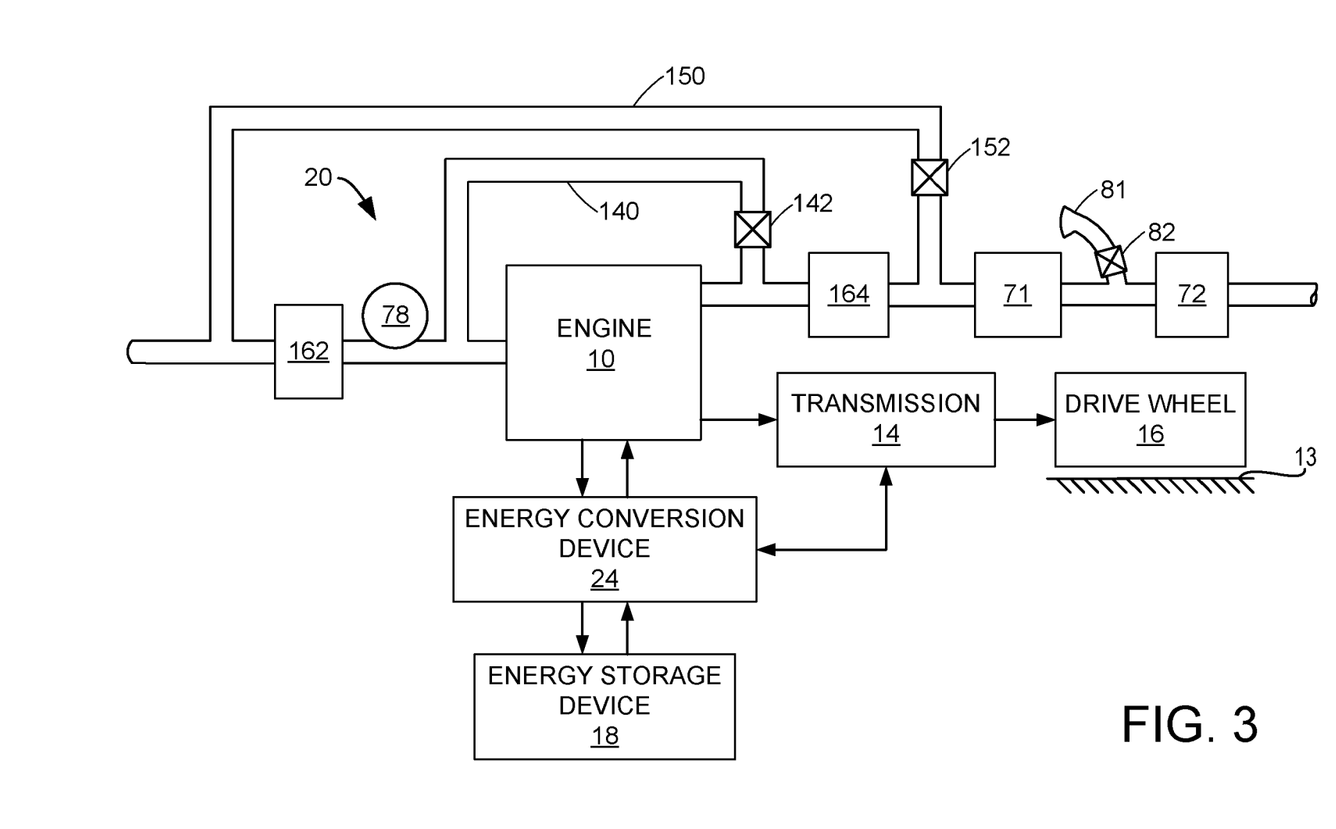
FIG. 3 shows a schematic diagram of a hybrid-electric propulsion system.

Referring now to FIG. 3, the figure schematically depicts a vehicle with a hybrid-electric propulsion system 20. Hybrid-electric propulsion system 20 includes an internal combustion engine 10, described above with particular reference to FIG. 1, coupled to transmission 14. Transmission 14 may be a manual transmission, automatic transmission, or combinations thereof. Further, various additional components may be included, such as a torque converter, and/or other gears such as a final drive unit, etc. Transmission 14 is shown coupled to drive wheel 16, which in turn is in contact with road surface 13.

In this example embodiment, the hybrid propulsion system also includes an energy conversion device 24, which may include a motor, a generator, among others and combinations thereof. The energy conversion device 24 is further shown coupled to an energy storage device 18, which may include a battery, a capacitor, a flywheel, a pressure vessel, etc. The energy conversion device can be operated to absorb energy from vehicle motion and/or the engine and convert the absorbed energy to an energy form suitable for storage by the energy storage device (e.g., provide a generator operation). The energy conversion device can also be operated to supply an output (power, work, torque, speed, etc.) to the drive wheels 16 and/or engine 10 (e.g., provide a motor operation). It should be appreciated that the energy conversion device may, in some embodiments, include only a motor, only a generator, or both a motor and generator, among various other components used for providing the appropriate conversion of energy between the energy storage device and the vehicle drive wheels and/or engine.

The depicted connections between engine 10, energy conversion device 24, transmission 14, and drive wheel 16 indicate transmission of mechanical energy from one component to another, whereas the connections between the energy conversion device and the energy storage device may indicate transmission of a variety of energy forms such as electrical, mechanical, etc. For example, torque may be transmitted from engine 10 to drive the vehicle drive wheels 16 via transmission 14. As described above, energy storage device 18 may be configured to operate in a generator mode and/or a motor mode. In a generator mode, energy storage device 18 absorbs some or all of the output from engine 10 and/or transmission 14, which reduces the amount of drive output delivered to the drive wheel 16, or the amount of braking torque to the drive wheel 16. Such operation may be employed, for example, to achieve efficiency gains through regenerative braking, improved engine efficiency, etc. Further, the output received by the energy conversion device may be used to charge energy storage device 18. In motor mode, the energy conversion device may supply mechanical output to engine 10 and/or transmission 14, for example by using electrical energy stored in an electric battery.

Hybrid-electric propulsion embodiments may include full hybrid systems, in which the vehicle can run on just the engine, just the energy conversion device (e.g., motor), or a combination of both. Assist or mild hybrid configurations may also be employed, in which the engine is the primary torque source, with the hybrid propulsion system acting to selectively deliver added torque, for example during tip-in or other conditions. Further still, starter/generator and/or smart alternator systems may also be used. The various components described above with reference to FIG. 3 may be controlled by a vehicle controller as described above with reference to FIG. 1.

From the above, it should be understood that the exemplary hybrid-electric propulsion system is capable of various modes of operation. In a full hybrid implementation, for example, the propulsion system may operate using energy conversion device 24 (e.g., an electric motor) as the only torque source propelling the vehicle. This "electric only" mode of operation may be employed during braking, low speeds, while stopped at traffic lights, etc. In another mode, engine 10 is turned on, and acts as the only torque source powering drive wheel 16. In still another mode, which may be referred to as an "assist" mode, the hybrid propulsion system may supplement and act in cooperation with the torque provided by engine 10. As indicated above, energy conversion device 24 may also operate in a generator mode, in which torque is absorbed from engine 10 and/or transmission 14. Furthermore, energy conversion device 24 may act to augment or absorb torque during transitions of engine 10 between different combustion modes (e.g., during transitions between a spark ignition mode and a compression ignition mode).

Further, hybrid-electric propulsion system 20 may include a fresh air inlet 81 positioned downstream of three way catalyst 71 and upstream of particulate filter 72, which is configured to operate as a ram air scoop. In this example, the fresh air inlet is positioned so that it opens towards the front end of the vehicle. As such, when the vehicle is in motion, fresh air (e.g., ambient air) may be "scooped", or rammed, into the ambient air inlet 81 and the fresh air is directed to flow into the exhaust passage, through PF 72, and out the tailpipe. As shown in FIG. 3, fresh air inlet 81 may include a fresh air inlet valve 82 (also referred to herein as a "ram air valve"). Ram air valve 82 may be employed to control the flow of fresh air into the exhaust passage.

Figure 4:
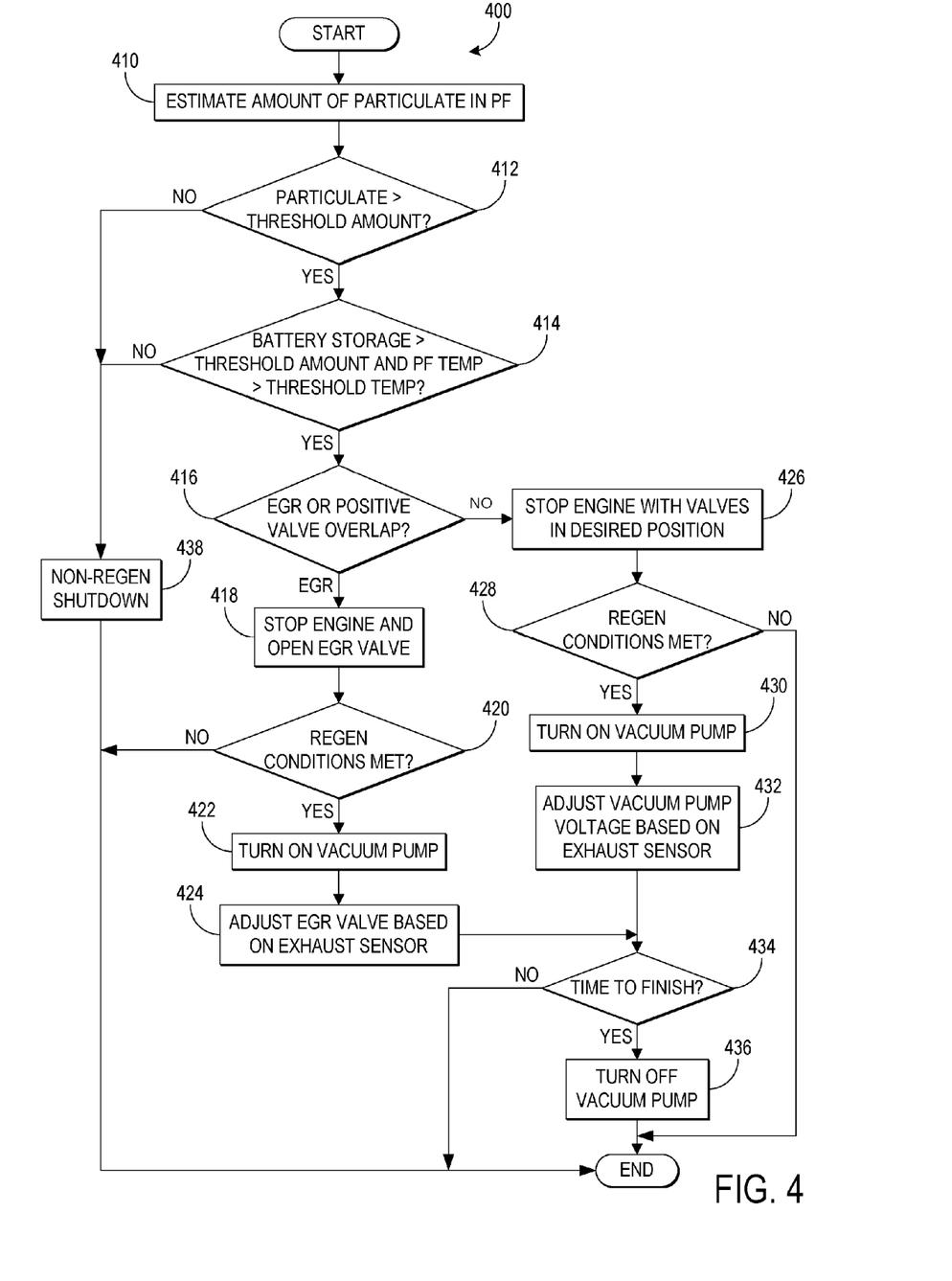
FIG. 4 shows a flow chart illustrating a routine for regenerating a particulate filter in an engine such as the engine depicted in FIG. 1.
Figure 5:
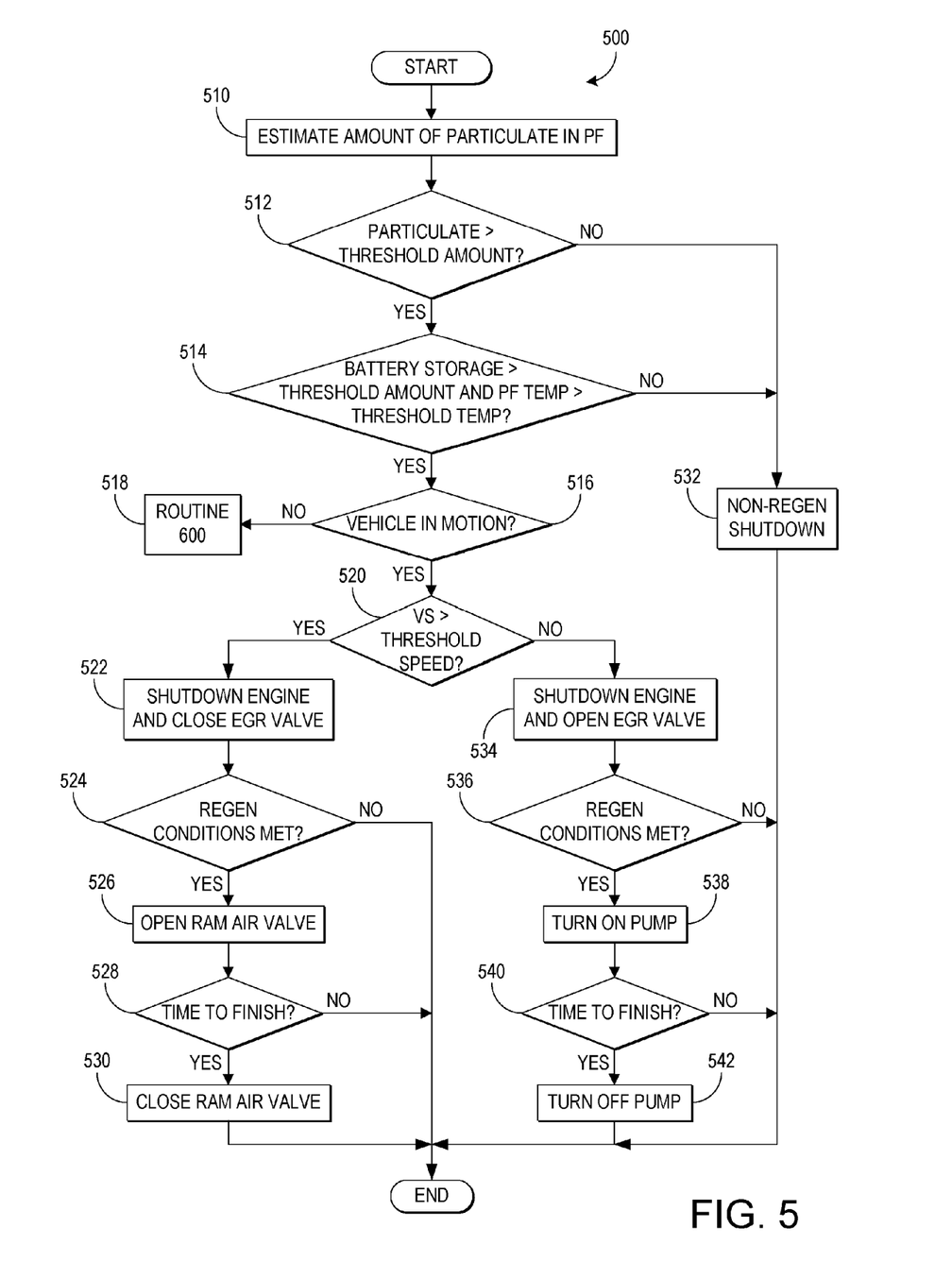
FIG. 5 shows a flow chart illustrating a routine for regenerating a particulate filter in a hybrid-electric propulsion system such as the system depicted in FIG. 3.
Figure 6:
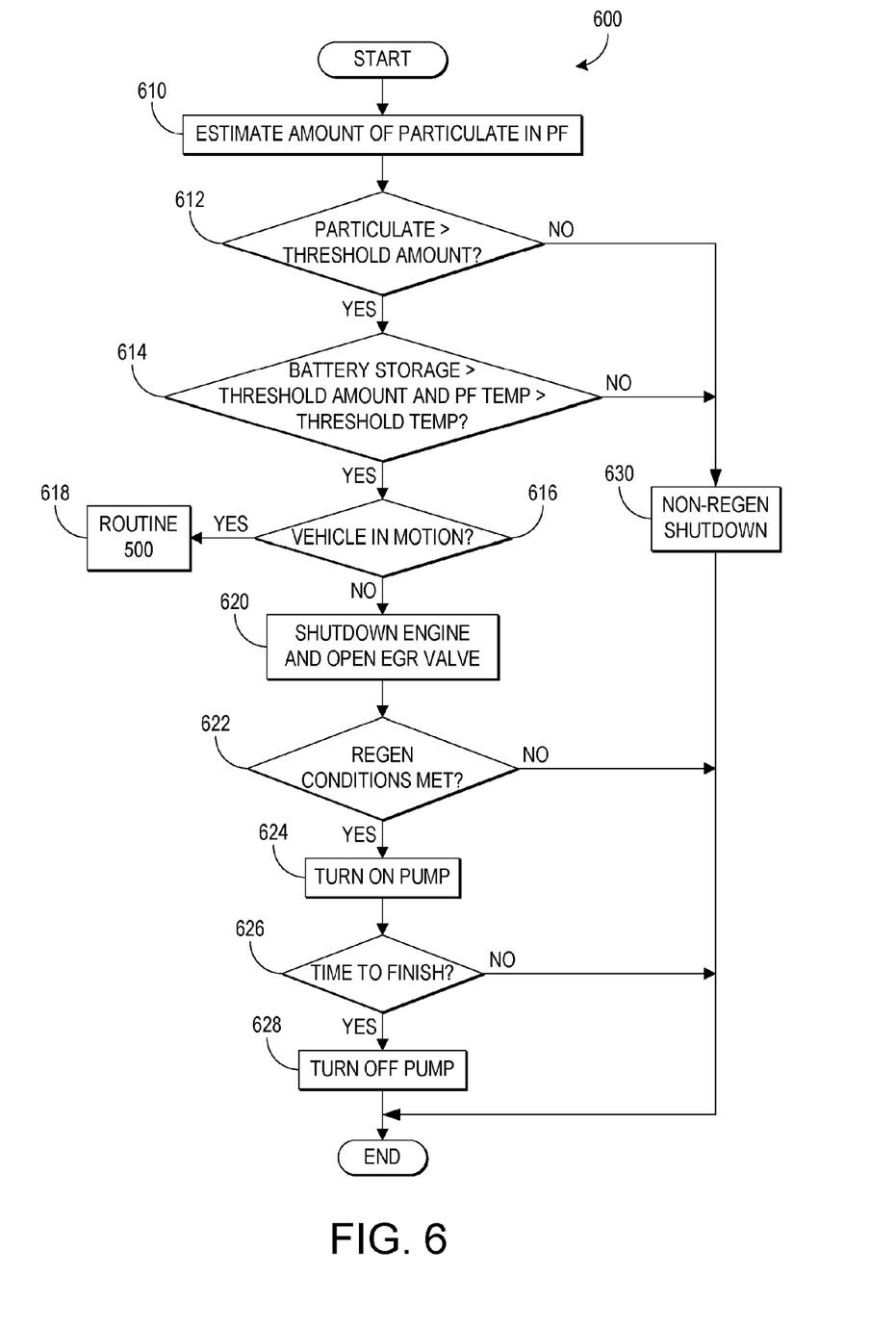
FIG. 6 shows a flow chart illustrating a routine for regenerating a particulate filter in a hybrid-electric propulsion system such as the system depicted in FIG. 3.
Figure 7:
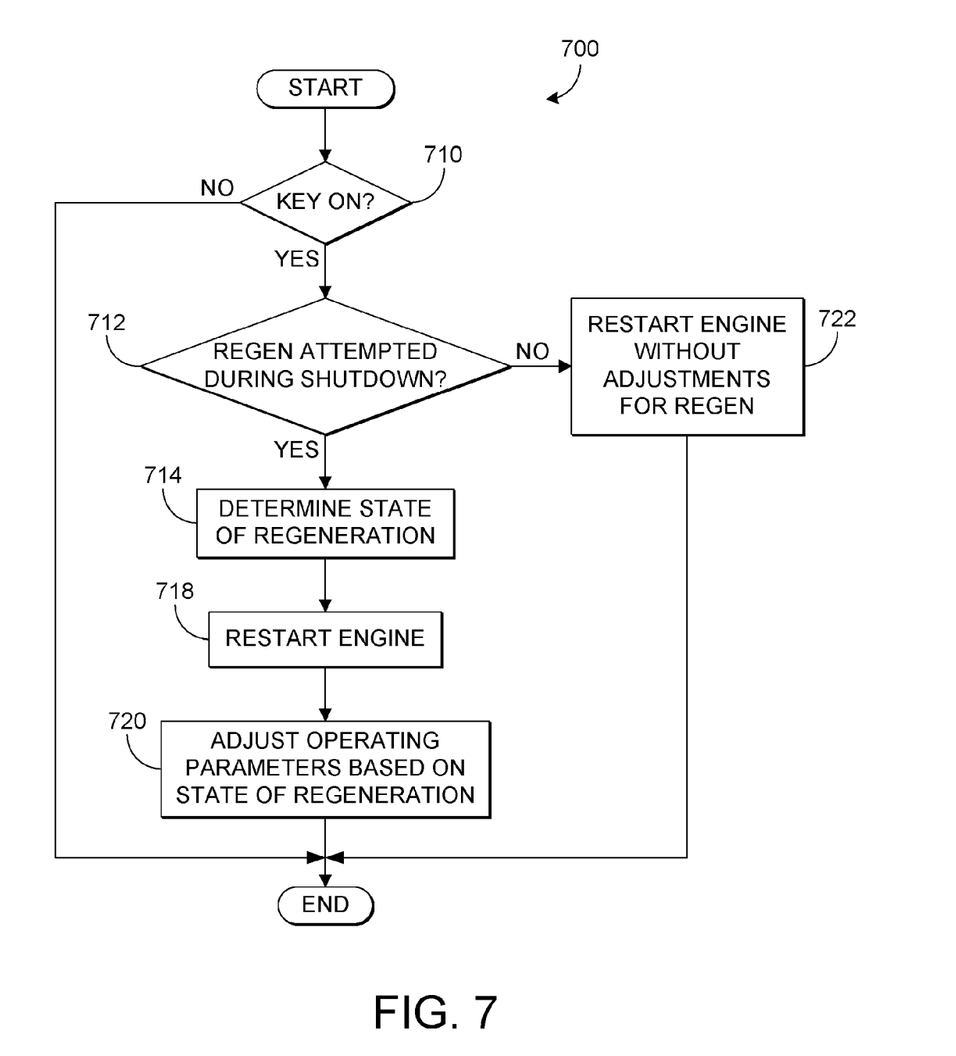
FIG. 7 shows a flow chart illustrating a routine for starting an engine based on a previous particulate filter regeneration during engine shutdown.

Example control routines for an engine, such as engine 10 described above with reference to FIG. 1, and a hybrid-electric propulsion system which may include engine 10 are shown in FIGS. 4-7. FIG. 4 illustrates a routine for regenerating a particulate filter in a direct injection gasoline engine during engine shutdown. FIGS. 5 and 6 illustrate routines for regenerating a filter in a hybrid-electric propulsion system that includes a direct injection gasoline engine which is shutdown during the regeneration. FIG. 7 shows an example routine for restarting an engine following a shutdown in which regeneration was carried out.

First, the flow chart in FIG. 4 shows a control routine 400 for regenerating a particulate filter in a direct injection, spark-ignition engine such as the engine depicted in FIG. 1, for example. Specifically, routine 400 determines whether or not particulate filter regeneration may occur while the engine is shutdown. When it is determined that regeneration may be attempted during shutdown, the intake and exhaust valves of at least one cylinder or the high pressure or low pressure exhaust gas recirculation valve is/are controlled to allow fresh air to flow into the exhaust system and through the particulate filter to facilitate regeneration of the particulate filter.

At 410 of routine 400, an amount of particulate (e.g., soot) in the particulate filter is estimated. In some embodiments, the amount of soot in the particulate filter may be determined based on a pressure drop across the particulate filter. In other embodiments, a soot accumulation model may be utilized to estimate the amount of soot in the particulate filter. Once the amount of soot is determined, routine 400 continues to 412 where it is determined if the amount of soot is greater than a threshold amount which may be used as an indication of whether or not to regenerate the particulate filter.

If the estimated amount of soot is less than the threshold amount, routine 400 moves to 438 where a non-regeneration shutdown is carried out (e.g., the particulate filter is not regenerated during engine shutdown). On the other hand, if the estimated amount of soot exceeds the threshold amount, routine 400 proceeds to 414 where it is determined if battery storage is greater than a threshold amount and if the particulate filter temperature is greater than a threshold amount. If the battery storage or the particulate filter temperature is less than its threshold amount or temperature, respectively, routine 400 moves to 438 where a non-regeneration shutdown is carried out. For example, if the battery storage is less than a threshold amount, the vacuum pump may be unable to operate during engine shutdown thus preventing conditions for regeneration. Further, soot in the particulate filter may not burn if the particulate filter temperature is too low (e.g., less than 600° C.).

If it is determined that the battery storage is greater than the threshold amount and the particulate filter temperature is greater than the threshold temperature, routine 400 of FIG. 4 continues to 416 where it is determined if the exhaust gas recirculation (EGR) system or positive valve overlap will be used to assist in regeneration of the particulate filter. As noted herein, drawing fresh air into the exhaust system via the tailpipe, for example, enables oxygen to be delivered to the particulate filter for engine-at-rest regeneration. To draw such air into the exhaust, the vacuum pump in the intake manifold uses a flow path from the intake to the exhaust. Under some conditions, this flow path may be generated via the high and/or low pressure EGR systems. For example, when using the low pressure EGR system, fresh air is drawn from the atmosphere, into the tailpipe, past the particulate filter, and then to the low pressure EGR system, and then to the intake manifold (and then to the vacuum pump, where it is exhausted to the exhaust of the vacuum pump), assuming a bypass around the compressor is opened. Alternatively, the high pressure EGR system may be used, assuming a bypass around the turbine is opened. In still another alternative, if the engine is stopped at a position in which communication between the intake and exhaust manifolds is present (through positive intake-exhaust valve overlap with both intake and exhaust valves at least partially open), then the fresh air may travel through the full exhaust system, through the cylinder, and then to the intake manifold. As such, depending on conditions of the shutdown (e.g., engine rest position, compressor and/or turbine bypass valve positions (open vs. closed), valve overlap, etc., the routine may select one or more paths for drawing fresh air through the particulate filter in a reverse direction compared with engine running exhaust flow.

If it is determined that EGR will be used to facilitate regeneration during engine shutdown, routine 400 proceeds to 418 where the engine is shutdown and spun down to rest and the low pressure or high pressure EGR valve is opened. Further, in this configuration, the engine is shutdown such that there is no positive intake-exhaust valve overlap. As such, air may flow from the exhaust to the intake via the exhaust gas recirculation system and not through the cylinders.

Once the EGR valve is opened, routine 400 continues to 420 where is it determined if regeneration conditions are met. Regeneration conditions may include, for example, exhaust temperature above a threshold temperature, particulate filter temperature above a threshold temperature, etc. For example, regeneration may not be carried out if the exhaust gas and/or particulate filter temperature are below a certain temperature. If regeneration conditions are not met, routine 400 ends and the particulate filter is not regenerated after engine shutdown. If regeneration conditions are met, however, routine 400 continues to 422 where the vacuum pump is turned on.

When the vacuum pump is turned on and the low pressure or high pressure EGR valve is open, fresh air is drawn through the tailpipe and into the exhaust. As such, the fresh air moves through the exhaust system in a direction opposite to the direction exhaust flows during engine operation. The fresh air is drawn through the particulate filter and three way catalyst, through the exhaust gas recirculation system, and into the intake manifold. In some embodiments, the air may be exhausted to a carbon canister coupled to the fuel system in order to reduce emissions produced by the regeneration of the particulate filter. In other embodiments, the air may be exhausted to the atmosphere.

At 424 of routine 400, the EGR valve is adjusted based on an exhaust gas sensor positioned between the three way catalyst and the particulate filter, such as sensor 127 shown in FIG. 1. For example, the exhaust gas sensor may indicate an amount of oxygen is greater than desired. As such, the EGR valve may be adjusted so that there is a smaller force drawing fresh air into the exhaust, and thus, less oxygen exiting the particulate filter.

At 434, the routine determines if a request to terminate regeneration has been generated. Such a request may be based on reaching a minimum soot loading amount, reaching a minimum regeneration rate, receiving an engine start request, detecting a door opening, receiving a door open request from a key-fob, etc., and/or other conditions. If so, the routine continues to 436 to turn off the vacuum pump and reduce regeneration of the filter.

On the other hand, if it is determined that positive valve overlap will be used to facilitate regeneration during engine shutdown, routine 400 of FIG. 4 moves to 426 where the engine is shutdown and spun down to rest with an intake valve and an exhaust valve of at least one cylinder in an open position. In some embodiments, the valve positions may be adjusted via variable valve timing (VVT) or electronic valve actuation (EVA) during engine shutdown. In other embodiments, the valves may be adjusted via EVA after the engine has shutdown.

After the intake and exhaust valves of at least one cylinder are opened, routine 400 proceeds to 428 where it is determined if regeneration (described above) conditions are met. If it is determined that regeneration conditions are met, routine 400 continues to 430 where the vacuum pump is turned on. Once the vacuum pump is on, its voltage may be modulated based on a desired parameter at 432. For example, the exhaust sensor positioned between the three way catalyst and the particulate filter may indicate there is less oxygen than desired. As such, the voltage applied to the vacuum pump may be increased in order to increase the amount of fresh air being drawn into the exhaust system through the tailpipe.

From either 432 or 424 the routine continues to 434 where the routine determines if a request to terminate regeneration has been generated, as described above.

Thus, by operating a vacuum pump during engine shutdown, fresh air may be drawn through the exhaust system in a direction which is opposite the direction of air flow during engine operation. In this manner, the particulate filter may be supplied with oxygen for regeneration without having to adjust engine operating parameters, such as air fuel ratio, and risking a decrease in engine efficiency.

Next, the flow chart in FIG. 5 illustrates a control routine 500 for regenerating a particulate filter in a hybrid-electric propulsion system such as the system depicted in FIG. 3, for example. Specifically, routine 500 determines if the vehicle is in motion and based on the speed that the vehicle is moving, the ram air valve or the EGR valve and a vacuum pump are controlled to allow fresh air to flow into the exhaust system and through the particulate filter to assist in regeneration of the particulate filter.

At 510 of routine 500, the amount of particulate (e.g., soot) in the particulate filter is estimated. As described above, the estimate of the amount of soot may be based on a measured pressure drop across the particulate filter or a soot accumulation model, for example. After an estimate of the amount of soot is determined, routine 500 proceeds to 512 where it is determined if the amount of particulate is greater than a threshold amount. If the amount of soot is less than a threshold amount, routine 500 moves to 532 where a non-regeneration shutdown is carried out.

On the other hand, if it is determined that the amount of particulate in the particulate filter exceeds a threshold amount, routine 500 of FIG. 5 continues to 514 where is it determined if the battery storage is greater than a threshold amount and if the particulate filter temperature is greater than a threshold temperature. In the case of a hybrid-electric vehicle, if the energy storage device (e.g., battery) does not have enough energy stored, the vehicle may not continue to run and components such as valve actuators may not be operated while the engine is off. Further, if the particulate filter is less than a threshold temperature, regeneration may not be achieved. As such, if battery storage is less than the threshold amount or if the particulate filter is less than the threshold temperature, routine 500 moves to 532 and a non-regeneration shutdown is carried out. In some examples in which the engine is part of a hybrid-electric system, shutdown may be desired for the purpose of regenerating the particulate filter. In such an example, the engine may not be shutdown at 532 and, instead, the engine may continue to run until shutdown conditions are met.

At 516 of routine 500, it is determined if the vehicle is in motion. If the vehicle is not in motion, routine 500 moves to 518 and routine 600 of FIG. 6 is executed, as will be described below. Continuing with FIG. 5, if it is determined that the vehicle is in motion, routine 500 proceeds to 520 where it is determined if the vehicle speed is greater than a threshold speed.

If it is determined that the vehicle speed is greater than the threshold speed, routine 500 continues to 522 where the engine is shutdown and the EGR valve is closed. Then, at 526, the ram air valve is opened. In such a configuration, the motion of the vehicle in a forward direction allows fresh air to be scooped into the exhaust system. With the EGR valve closed, fresh air may flow into the exhaust system, through the particulate filter, and out of the tailpipe. In this manner, the particulate filter may be supplied with fresh air containing oxygen that may facilitate regeneration of the particulate filter.

Once the engine is shutdown and the EGR valve is closed, routine 500 proceeds to 524 where it is determined if regeneration conditions are met. As described above, regeneration conditions may include exhaust temperature and/or particulate filter temperature above respective threshold temperatures. If regeneration conditions are not met, regeneration may not be achieved during engine shutdown and routine 500 may end.

If, on the other hand, regeneration conditions are met, routine 500 of FIG. 5 continues to 526 where the ram air valve is opened. When the ram air valve is opened and the EGR valve is closed while the vehicle is traveling above a threshold speed, fresh air may enter the exhaust system and flow through the particulate filter and out of the tailpipe to the atmosphere (e.g., the direction of flow in the exhaust system is the same as that during engine operation). During regeneration, the position of the ram air valve may be adjusted to let more or less fresh air into the exhaust system. For example, if the exhaust gas sensor downstream of the particulate filter indicates an increase in the amount of oxygen exiting the particulate filter, the ram air valve may be adjusted to decrease the flow of fresh air into the exhaust system.

At 528 of routine 500, it is determined if a request to terminate regeneration has been generated (e.g., if there is time to finish the regeneration). As described above, such a request may be based on the regeneration rate, amount of soot in the filter, receiving an engine start request, etc. For example, in a hybrid-electric vehicle, a request to start the engine may come from the controller due to a low battery state of charge, motor over temperature, etc. If it is determined that a regeneration request has been generated, routine 500 continues to 530 where the ram air valve is closed and regeneration of the particulate filter is reduced.

In contrast, if it is determined that the vehicle speed is less than the threshold speed at 520 of FIG. 5, routine 500 moves to 534 where the engine is shutdown and spun down to rest and the EGR valve is opened. If the vehicle speed is less than a threshold speed, the vehicle may not be moving fast enough to scoop air in through the ram air inlet. As such, if the EGR valve is opened, a vacuum pump may be utilized as discussed above to draw air backwards through the exhaust system and through the exhaust gas recirculation system. Further, the engine may be shutdown so that there is no positive valve overlap in the cylinders (i.e., intake and exhaust valves are closed in each cylinder of the engine). Further still, the ram air valve may be closed during the regeneration during shutdown. In this manner, products of regeneration may be filtered in the three way catalyst and/or sent to a carbon canister coupled to the fuel system instead of being released to the atmosphere.

At 536 of routine 500, it is determined if regeneration conditions are met. As described above, if regeneration conditions are not met, regeneration may not be carried out and routine 500 ends. On the other hand, if regeneration conditions are met, routine 500 proceeds to 538 where the vacuum pump is turned on. Once the vacuum pump is turned on, air is drawn through the tailpipe and through the particulate filter and three way catalyst in the exhaust system in a direction that is opposite to the direction exhaust flows during engine operation.

As with 526, from 538, routine 500 proceeds to 540 where it is determined if a request to terminate regeneration has been generated. If it is determined that a request to terminate regeneration has been generated, routine 500 continues to 542 where the vacuum pump is turned off and regeneration of the particulate filter is reduced.

Moving on to FIG. 6, the flow chart in FIG. 6 shows a control routine 600 for regenerating a particulate filter in a hybrid-electric propulsion system such as the system depicted in FIG. 3, for example. Specifically, routine 600 determines if the vehicle is in motion and when it is determined that the vehicle is stopped, the EGR valve and a vacuum pump are controlled to allow fresh air to flow into the exhaust system and through the particulate filter to assist in regeneration of the particulate filter.

At 610 of routine 600, an amount of particulate (e.g., soot) in the particulate filter is estimated. As described above, the estimate of the amount of particulate may be based on a measured pressure drop across the particulate filter or a soot accumulation model, for example. Once the amount of soot in the particulate filter is determined, routine 600 proceeds to 612 where it is determined if the amount of particulate is greater than a threshold amount. If the amount of soot is less than a threshold amount, routine 600 moves to 630 where a non-regeneration shutdown is carried out.

As with routine 500 of FIG. 5, if it is determined that the amount of soot in the particulate filter exceeds a threshold amount, routine 600 moves to 614 where it is determined if the battery storage is greater than a threshold storage amount and if the particulate filter temperature is greater than a threshold temperature. In some examples, the engine may be shutdown when the vehicle is not in motion. In such an example, the threshold amount of battery storage is not as great as when the energy storage device is utilized to facilitate motion of the vehicle. As such, the threshold battery storage amount may be less in routine 600 than in routine 500. If it is determined that the battery storage is less than the threshold amount or if the particulate filter is less than the threshold temperature, routine 600 moves to 630 where a non-regeneration shutdown is carried out.

If it is determined that the battery storage is greater than the threshold amount and the particulate filter temperature is greater than the threshold temperature, routine 600 of FIG. 6 proceeds to 616 where it is determined if the vehicle is in motion. If it is determined that the vehicle is in motion, routine 600 moves to 618 where routine 500 of FIG. 5 is executed.

On the other hand, if it is determined that the vehicle is not in motion, routine 600 of FIG. 6 continues to 620 where the engine is shutdown and the EGR valve is opened. Because the vehicle is not in motion, air may not be forced through the ram air inlet and into the exhaust system. As such, a vacuum pump coupled to the intake manifold may be used to draw air through the exhaust in order to facilitate regeneration of the particulate filter. In such a configuration, as described above, the EGR valve is opened such that the vacuum pump may draw air through the tailpipe and into the exhaust system, through the EGR system, and into the intake manifold.

Once the EGR valve is opened, it is determined if regeneration conditions are met at 622 of routine 600. Regeneration conditions may include exhaust gas temperature and/or particulate filter above threshold values. If regeneration conditions are not met at 622, regeneration may not be carried out and routine 600 ends. On the other hand, if regeneration conditions are met, routine 600 continues to 624 where the vacuum pump is turned on.

At 626 of routine 600, it is determined if a request to terminated regeneration of the particulate filter has been generated. As described above, the request may include conditions such as receiving an engine start request, reaching a minimum regeneration rate, etc. If it is determined that a request to terminate regeneration has been generated, routine 600 proceeds to 628 where the vacuum pump is turned off and regeneration of the particulate filter is reduced.

Thus, regeneration of the particulate filter may be carried out during engine shutdown while the vehicle is in motion or while the vehicle is stopped. Based on whether or not the vehicle is moving and the speed of the vehicle when it is in motion, regeneration during engine shutdown may be facilitated by drawing fresh air into the exhaust system via a vacuum pump or a ram air inlet.

Finally, the flow chart in FIG. 7 illustrates a control routine 700 for starting an engine after a regeneration of the particulate filter after shutdown has occurred, without any other starts between the shutdown regeneration and the current start. Specifically, routine 700 adjusts engine operating parameters during engine start based on a state of the regeneration attempted during engine shutdown.

At 710 of routine 700 it is determined if the vehicle is on by checking if a key is on, in this example. In some embodiments, such as when the vehicle has a hybrid-electric propulsion system, the key may have remained on during engine shutdown. If it is determined that the key is not on, routine 700 ends.

On the other hand, if it is determined that the key is on, routine 700 proceeds to 712 where is it determined if regeneration was attempted during engine shutdown. In some embodiments, the engine may be shutdown with no attempt to regenerate the particulate filter (e.g., without drawing in fresh air via vacuum or ram air inlet). If it is determined that regeneration was not attempted during shutdown, routine 700 moves to 722 where the engine is started without adjustments for regeneration. This may include starting the engine with a first air fuel ratio profile, idle speed set-point, spark timing profile, etc.

However, if it is determined that the regeneration was attempted and/or successfully completed during a previous engine shutdown, routine 700 continues to 714 where the state of regeneration is determined. For example, regeneration may have been attempted, but the attempt may have been cancelled because regeneration conditions were not met or an engine start was requested. In other examples, regeneration may have started and been terminated before the regeneration of the particulate filter was completed (e.g., regeneration was partially completed). In further examples, regeneration may have been started but only a portion of stored soot may have been removed by regeneration. Further still, depending on a temperature of the three-way catalyst during engine shutdown regeneration, more or less excess oxygen may have been stored at the three-way catalyst.

Once the state of regeneration is determined, routine 700 of FIG. 7 proceeds to 718 where the engine is started. Then routine 700 continues to 720 where engine operating parameters are adjusted based on the state of regeneration. Engine operating parameters may include, but are not limited to, air fuel ratio, spark timing, etc. For example, if the regeneration was attempted and only partially completed, there may be less $O_2$ in the three way catalyst than if the regeneration had been more fully carried out. As such, the air fuel ratio may be adjusted to be more rich (or less lean) of stoichiometry in order to reduce the excess $O_2$ in the three way catalyst during the engine start.

In another example, the engine may be started in such a way as to continue regeneration if it was not completed during engine shutdown. For example, in a vehicle with a hybrid-electric propulsion system, the engine may need to be started as the vehicle accelerates and regeneration of the particulate filter during the engine shutdown may not have completed. As such, the air-fuel ratio may be adjusted to be lean of stoichiometry and the spark timing may be retarded in order to continue to supply the particulate filter with $O_2$ for regeneration.

Therefore, based on the state of the regeneration during engine shutdown, the engine may be restarted in such a manner so as to continue the regeneration or reduce the effects of the regeneration on components such as the three way catalyst.

As described above with reference to the figures, a direct injection gasoline engine may have a particulate filter coupled to its exhaust system to collect soot generated during operating conditions, such as high speed and high load. Further, in order to maintain engine efficiency, the particulate filter may be regenerated while the engine is shutdown. Based on operating conditions and the vehicle system (e.g., hybrid-electric vehicle), a vacuum pump or a ram air inlet may be used to facilitate regeneration of the particulate filter during engine shutdown.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

Such claims, whether broader, narrower, equal, or different in scope to the original claims, also are regarded as included within the subject matter of the present disclosure.

The invention claimed is:

1. A method for controlling a vehicle engine having an exhaust system which includes a particulate filter, comprising:
    during vehicle motion:
        shutting down the engine and spinning down the engine to rest; and
        during engine rest after the engine is spun down,
            if vehicle speed is greater than a threshold speed, closing an EGR valve arranged in an EGR passage coupled to the exhaust system upstream of a catalyst, opening a ram air valve arranged in a scoop inlet coupled in the exhaust system downstream of the catalyst and upstream of a particulate filter, the scoop inlet opening toward a vehicle front end, and drawing a ram air flow, via the scoop inlet, into the exhaust system and through the particulate filter to assist in regeneration of the particulate filter; and
            if vehicle speed is not greater than the threshold speed, opening the EGR valve.

2. The method of claim 1, wherein the vehicle has a hybrid-electric propulsion system.

3. The method of claim 1, wherein ram air flow enters the exhaust system downstream of an SCR catalyst, the SCR catalyst positioned upstream of the particulate filter.

4. The method of claim 3, wherein the vehicle has a hybrid-electric propulsion system.

5. The method of claim 4, wherein a ram air valve positioned in the ram air flow before it enters the exhaust system controls the ram air flow into the exhaust system in response to a vehicle speed being greater than a threshold.

6. The method of claim 3, further comprising, during the vehicle motion, closing the EGR valve.

7. The method of claim 3, wherein a ram air valve positioned in the ram air flow before it enters the exhaust system opens the ram air flow to provide fresh airflow into the exhaust system in response to an amount of particulate matter stored being greater than a threshold.

8. A method for controlling a vehicle engine having an exhaust system including an SCR catalyst and particulate filter, comprising:
during vehicle motion:
shutting down the engine and spinning down the engine to rest; and
during engine rest after the engine is spun down,
if vehicle speed is greater than a threshold speed, closing an EGR valve arranged in an EGR passage coupled to the exhaust system upstream of the SCR catalyst, opening a ram air valve arranged in a scoop inlet coupled in the exhaust system downstream of the SCR catalyst and upstream of the particulate filter, the scoop inlet opening toward a vehicle front end, and drawing a fresh ram air flow, via the scoop inlet, into the exhaust system downstream of the SCR catalyst and then through the particulate filter during particulate filter regeneration; and
if vehicle speed is not greater than the threshold speed, opening the EGR valve.

9. The method of claim 8, wherein the vehicle has a hybrid-electric propulsion system.

10. The method of claim 9, wherein a ram air valve positioned in the ram air flow before it enters the exhaust system controls the ram air flow into the exhaust system in response to a vehicle speed being greater than a threshold.

11. The method of claim 8, further comprising, during the vehicle motion, closing the EGR valve.

12. The method of claim 8, wherein a ram air valve positioned in the ram air flow before it enters the exhaust system opens the ram air flow to provide fresh airflow into the exhaust system in response to an amount of particulate matter stored being greater than a threshold.

13. A method for controlling a vehicle engine having an exhaust system including a turbocharger turbine and particulate filter, comprising:
during vehicle motion:
shutting down the engine and spinning down the engine to rest; and
during engine rest after the engine is spun down,
if vehicle speed is greater than a threshold speed, closing an EGR valve arranged in an EGR passage coupled to the exhaust system upstream of a catalyst, the catalyst arranged downstream of the turbine, opening a ram air valve arranged in a scoop inlet coupled in the exhaust system downstream of the catalyst and upstream of the particulate filter, the scoop inlet opening toward a vehicle front end, and drawing a fresh ram air flow, via the scoop inlet, into the exhaust system downstream of the catalyst and the turbine and then through the particulate filter during particulate filter regeneration; and
if vehicle speed is not greater than the threshold speed, opening the EGR valve.

14. The method of claim 13, wherein the vehicle has a hybrid-electric propulsion system.

15. The method of claim 14, wherein a ram air valve positioned in the ram air flow before it enters the exhaust system controls the ram air flow into the exhaust system in response to a vehicle speed being greater than a threshold.

16. The method of claim 14, wherein a ram air valve positioned in the ram air flow before it enters the exhaust system opens the ram air flow to provide fresh airflow into the exhaust system in response to an amount of particulate matter stored being greater than a threshold.

\* \* \* \* \*